United States Patent  (10) Patent No.: US 7,589,433 B2
Otani et al.  (45) Date of Patent: Sep. 15, 2009

(54) ELECTRIC STEERING LOCK

(75) Inventors: Kazuya Otani, Aichi (JP); Toru Maeda, Aichi (JP); Toshihiro Nagae, Aichi (JP); Tomoo Kakegawa, Aichi-ken (JP)

(73) Assignees: Kabushiki Kaisha Tokai Rika Denki Seisakusho, Aichi (JP); Toyota Jidosha Kabushiki Kaisha, Aichi-ken (JP)

( * ) Notice: Subject to any disclaimer, the term of this patent is extended or adjusted under 35 U.S.C. 154(b) by 421 days.

(21) Appl. No.: 10/576,237

(22) PCT Filed: Sep. 27, 2005

(86) PCT No.: PCT/JP2005/018242

§ 371 (c)(1), (2), (4) Date: Apr. 18, 2006

(87) PCT Pub. No.: WO2006/035972

PCT Pub. Date: Apr. 6, 2006

(65) Prior Publication Data

US 2007/0138869 A1 Jun. 21, 2007

(30) Foreign Application Priority Data

Sep. 30, 2004 (JP) ............................. 2004-287622

(51) Int. Cl.
*B60R 25/00* (2006.01)
*B60L 3/00* (2006.01)
(52) U.S. Cl. ...................... 307/10.2; 307/10.1; 307/9.1
(58) Field of Classification Search ................. 307/10.2
See application file for complete search history.

(56) References Cited

U.S. PATENT DOCUMENTS

| 6,400,041 | B1 | 6/2002 | Engelmann et al. |
| 2002/0074858 | A1* | 6/2002 | Staudt et al. ................. 307/9.1 |
| 2004/0004397 | A1 | 1/2004 | Nagae et al. |
| 2007/0138868 | A1* | 6/2007 | Kokuryo et al. .............. 307/9.1 |

FOREIGN PATENT DOCUMENTS

| EP | 1 072 487 A1 | 1/2001 |
| JP | 2003-291779 | 10/2003 |

* cited by examiner

*Primary Examiner*—Fritz M Fleming
*Assistant Examiner*—Dru M Parries
(74) *Attorney, Agent, or Firm*—Patterson, Thuente, Skaar & Christensen, P.A.

(57) ABSTRACT

An electric steering lock capable of outputting a signal correctly indicating an operation state of a steering lock mechanism even when the operation voltage of a lock detector decreases. The electric steering lock includes a CPU, a signal hold circuit, and an OR circuit. When the steering lock mechanism unlocks a steering wheel, an unlock sensor provides an H level detection signal to the CPU and the signal hold circuit. In response to the detection signal, the CPU issues a state hold command to the signal hold circuit. In response to the state hold command, the signal hold circuit generates an H level hold signal in correspondence with the detection signal. The OR circuit provides an H level signal to an immobilizer ECU when at least one of the detection signal from the unlock sensor or the hold signal has an H level.

7 Claims, 2 Drawing Sheets

ELECTRIC STEERING LOCK

TECHNICAL FIELD

The present invention relates to an electric steering lock.

BACKGROUND ART

An electronic key system is known as a system for performing operations in a vehicle without using a mechanical key. The electronic key system is provided with a keyless entry function for unlocking doors when a user (driver) holding an electronic key approaches a door and locking the doors when the user moves away from a door. The electronic key system is also provided with an ignition function for starting the engine by just rotating an ignition switch without inserting a mechanical key into a key cylinder.

The electronic key system includes an electric steering lock, which electrically locks and unlocks a steering wheel. The electric steering lock has a lock bar that is moved by a lock motor. The lock bar is engaged with a socket formed in the steering shaft to lock the steering shaft. The steering shaft is unlocked when the lock bar is removed from the socket of the steering shaft.

The electric steering lock includes a lock switch and an unlock switch. The lock switch goes ON when the steering shaft is locked to output an H level signal (lock signal). The unlock switch goes ON when the steering shaft is unlocked to output an H level signal (unlock signal). The electric steering lock determines whether the steering shaft is locked or unlocked based on the output signal from the lock switch or the unlock switch. An electric non-contact switch having high durability and reliability is used as the lock and unlock switches. An example of such an electric non-contact switch is a Hall IC.

The operation of the electronic key system when starting the engine will now be described. When the steering shaft shifts to the unlock state from the lock state, the unlock switch is switched ON to generate an unlock signal. The electric steering lock provides the unlock signal to an engine ECU. When receiving the unlock signal, the engine ECU starts the engine if the electronic key and the vehicle achieve ID code authentication and the ignition switch is rotated to the engine start position.

When operation voltage decreases, the voltage of a detection signal of the electric non-contact switch may decrease. For example, when starting (cranking) the engine, the starter motor and igniters consume much battery voltage. Thus, the unlock switch may not be supplied with sufficient voltage. This would decrease the voltage of the output signal from the unlock switch. Particularly, decrease in the operation voltage of the unlock switch tends to occur when the battery has deteriorated or when cranking is performed at low temperatures.

When the unlock switch is in a low voltage state, the output of an H level signal, or an unlock signal, may not be maintained. In such a case, no unlock signal will be provided from the electric steering lock to the engine ECU even though the steering shaft is in the unlock state. Since the unlock signal is necessary to start the engine, the engine ECU will not start the engine. Therefore, the electronic key system of the prior art using such an electric steering lock may erroneously determine that the steering shaft is in the unlock state when the operation voltage decreases. It is thus required that such an erroneous determination of the steering shaft being in the unlock state be prevented even when the battery voltage is low.

SUMMARY OF THE INVENTION

It is an object of present invention to provide an electric steering lock that prevents erroneous determination of the operation state of a steering lock mechanism even when the operation voltage decreases.

One aspect of the present invention is an electric steering lock for locking and unlocking a steering shaft having a socket. The electric steering lock has a steering lock mechanism. The steering lock mechanism includes a latch member movable to be engaged with and disengaged from the socket in the steering shaft. A drive means drives the latch member. The steering lock mechanism is shiftable between a plurality of operation states including a lock state in which the latch member is engaged with the socket and an unlock state in which the latch member is disengaged from the socket. A detection means detects at least one of the operation states, including the lock state and the unlock state, of the steering lock mechanism and outputs a detection signal when shifting to the at least one of the operation states is completed. A state holding means, connected to the detection means, generates a hold signal held at a voltage that is the same as that of the detection signal and for outputting a completion signal indicating that shifting to the at least one of the operation states has been completed in accordance with at least one of the detection signal, provided from the detection means, and the hold signal.

A further aspect of the present invention is an electric steering lock for connection to a battery for power supply for locking and unlocking a steering shaft. The electric steering lock includes a latch member movable between a lock position at which the latch member is engaged with the steering shaft and an unlock position at which the latch member is disengaged from the steering shaft. A drive means drives the latch member. A non-contact unlock sensor is powered by the battery and is activated to output an unlock detection signal when the latch member is in the unlock position. A hold circuit, connected to the unlock sensor, outputs a hold signal corresponding to the unlock detection signal. An OR circuit, connected to the unlock sensor and the hold circuit, outputs an unlock completion signal when at least one of the unlock signal and the hold signal has a predetermined level.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

BEST MODE FOR CARRYING OUT THE INVENTION

An electric steering lock according to a preferred embodiment of the present invention will now be described with reference to FIGS. 1 and 2.

Figure 1:
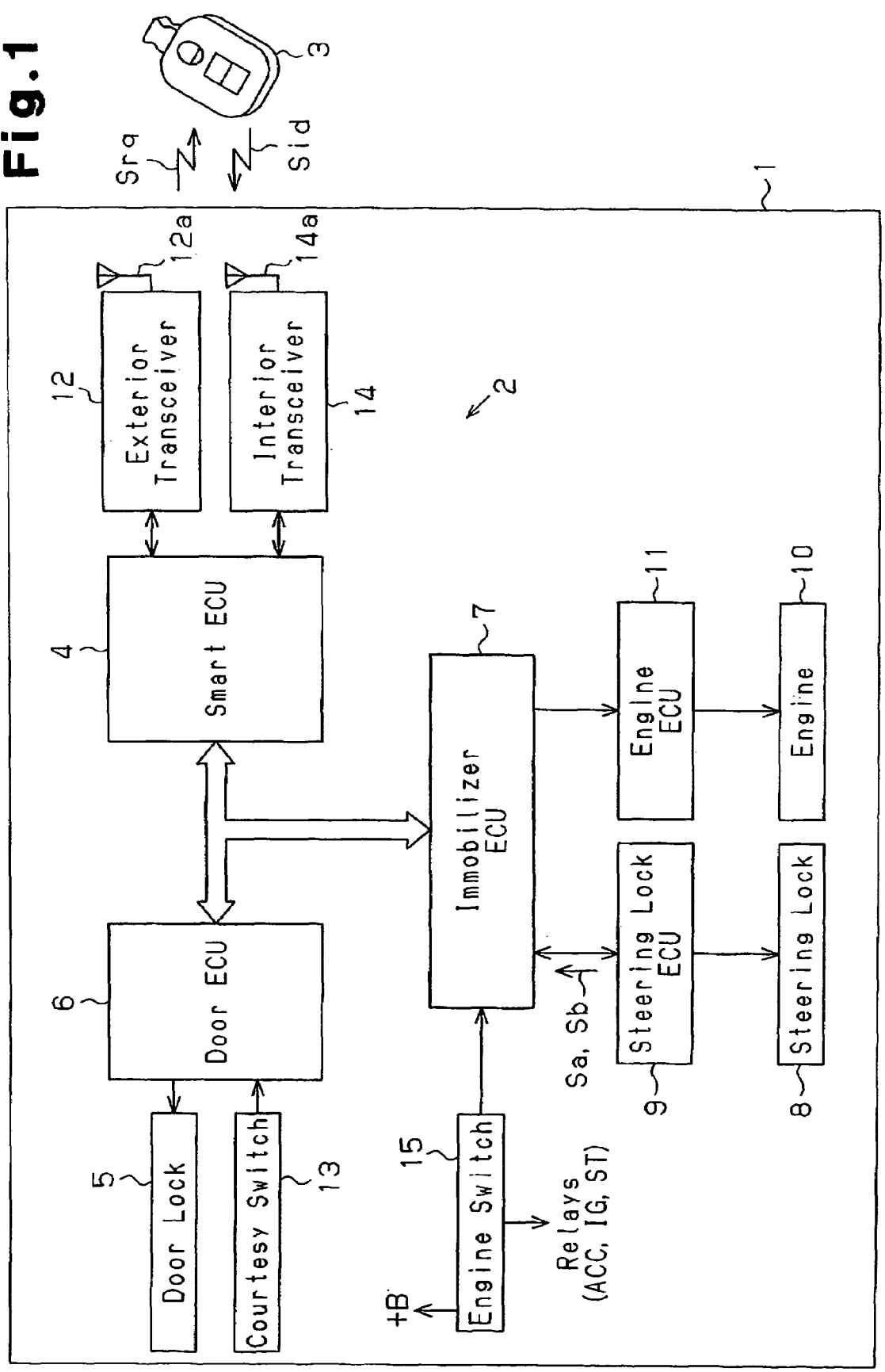
FIG. 1 is a block diagram of an electronic key system employing an electric steering lock according to a preferred embodiment of the present invention.

As shown in FIG. 1, a vehicle 1 includes an electronic key system 2 for performing vehicle operations without using an ignition key. The electronic key system 2 enables an operation to be started in the vehicle 1 without using a key as long as an ID code assigned to an electronic key 3 and an ID code of the vehicle 1 are identical. The vehicle operations include locking and unlocking of the vehicle doors, locking and unlocking of the steering shaft, starting of the engine, and the opening of the luggage compartment.

The electronic key system 2 includes a smart ECU 4 for performing ID authentication with the electronic key 3, a door ECU 6 for controlling a door lock 5, and an immobilizer ECU 7 for determining whether to enable or disable vehicle operations (e.g., unlocking of the steering wheel and starting of the engine) based on the result of passenger compartment authentication of the electronic key 3. The electronic key system 2 further includes a steering lock ECU 9 for controlling a steering lock mechanism 8 and an engine ECU 11 for controlling the engine 10. An electric steering lock 100 includes the steering lock mechanism 8 and the steering lock ECU 9.

When the vehicle 1 is parked (state in which the engine is stopped and the doors are locked), the smart ECU 4 issues a command to an exterior transceiver circuit 12 to intermittently transmit a request signal Srq via an exterior antenna 12a. When a person holding the electronic key 3 enters a communication area of the request signal Srq, in response to the request signal Srq, the electronic key 3 transmits an ID code signal Sid containing an ID code that is unique to the key. The ID code signal Sid, which is received by an exterior antenna 12a, is provided to the smart ECU 4 via the exterior transceiver circuit 12. An ID code unique to the vehicle is stored in the smart ECU 4. The smart ECU 4 performs exterior authentication to compare the ID code of the electronic key 3 contained in the ID code signal Sid with the ID code of the vehicle 1 (ID authentication). If the exterior authentication is achieved, the smart ECU 4 issues a door unlock command to the door ECU 6. The door ECU 6 unlocks the door lock 5 in response to the door unlock command.

When the door lock 5 is in the unlock state, the exterior authentication has been achieved, and neither the exterior antenna 12a nor the exterior transceiver circuit 12 is receiving the ID code signal Sid, the smart ECU 4 determines that the door needs be locked. Thus, the smart ECU 4 issues a door lock command to the door ECU 6. In response to the door lock command, the door ECU 6 locks the door lock 5.

When the door ECU 6 determines that a person has entered the vehicle from a detection signal from a courtesy switch 13, which detects the opening and closing of a door, the door ECU 6 issues a communication switch command to the smart ECU 4. In response to the communication switch command, the smart ECU 4 activates an interior transceiver circuit 14 and interior antenna 14a in place of the exterior transceiver circuit 12 and the exterior antenna 12a. The interior transceiver circuit 14 intermittently outputs a request signal Srq in the passenger compartment of the vehicle via the interior antenna 14a. The smart ECU 4 performs interior authentication to compare the ID code of the electronic key 3 contained in the ID code signal Sid with the ID code of the vehicle 1. If the interior authentication is achieved, the smart ECU 4 provides an interior authentication completion signal to the immobilizer ECU 7. In response to the interior authentication completion signal, the immobilizer ECU 7 issues a steering unlock command to the steering lock ECU 9. In response to the steering unlock command, the steering lock ECU 9 enters an unlock standby state.

When in the unlock standby state, the steering lock ECU 9 starts an unlock operation of the steering lock mechanism 8 in response to operation of the engine switch 15. Upon completion of the unlock operation of the steering lock mechanism 8, the steering lock ECU 9 provides an unlock completion signal Sa to the immobilizer ECU 7. In response to the unlock completion signal Sa, the immobilizer ECU 7 issues an engine start enable command to the engine ECU 11. When receiving the engine start enable command and if the interior authentication is achieved and the engine switch 15 is rotated to the start position, the engine ECU 11 drives a starter motor to start the engine.

When the engine switch 15 is operated to stop the engine 10, the steering lock ECU 9 enters a lock standby-state. Based on a detection signal from the courtesy switch 13; the door ECU 6 provides the immobilizer ECU 7 with an exit signal indicating that the driver has exited the vehicle 1. In response to the exit signal, the immobilizer ECU 7 issues a steering lock command to the steering lock ECU 9.

In response to the steering lock command, the steering lock ECU 9, which is in the lock standby state, drives the steering lock mechanism 8 to lock a steering shaft 16. The steering lock ECU 9 provides a steering lock completion signal Sb to the immobilizer ECU 7 when the steering lock mechanism 8 has shifted to a lock state. The smart ECU 4 performs exterior authentication when determining that the steering lock completion signal Sb has been provided to the immobilizer ECU 7 and the driver has exited the vehicle compartment. The smart ECU 4 causes the door ECU 6 to lock the door lock 5 when the exterior antenna 12a stops receiving the ID code signal Sid from the electronic key 3.

Figure 2:
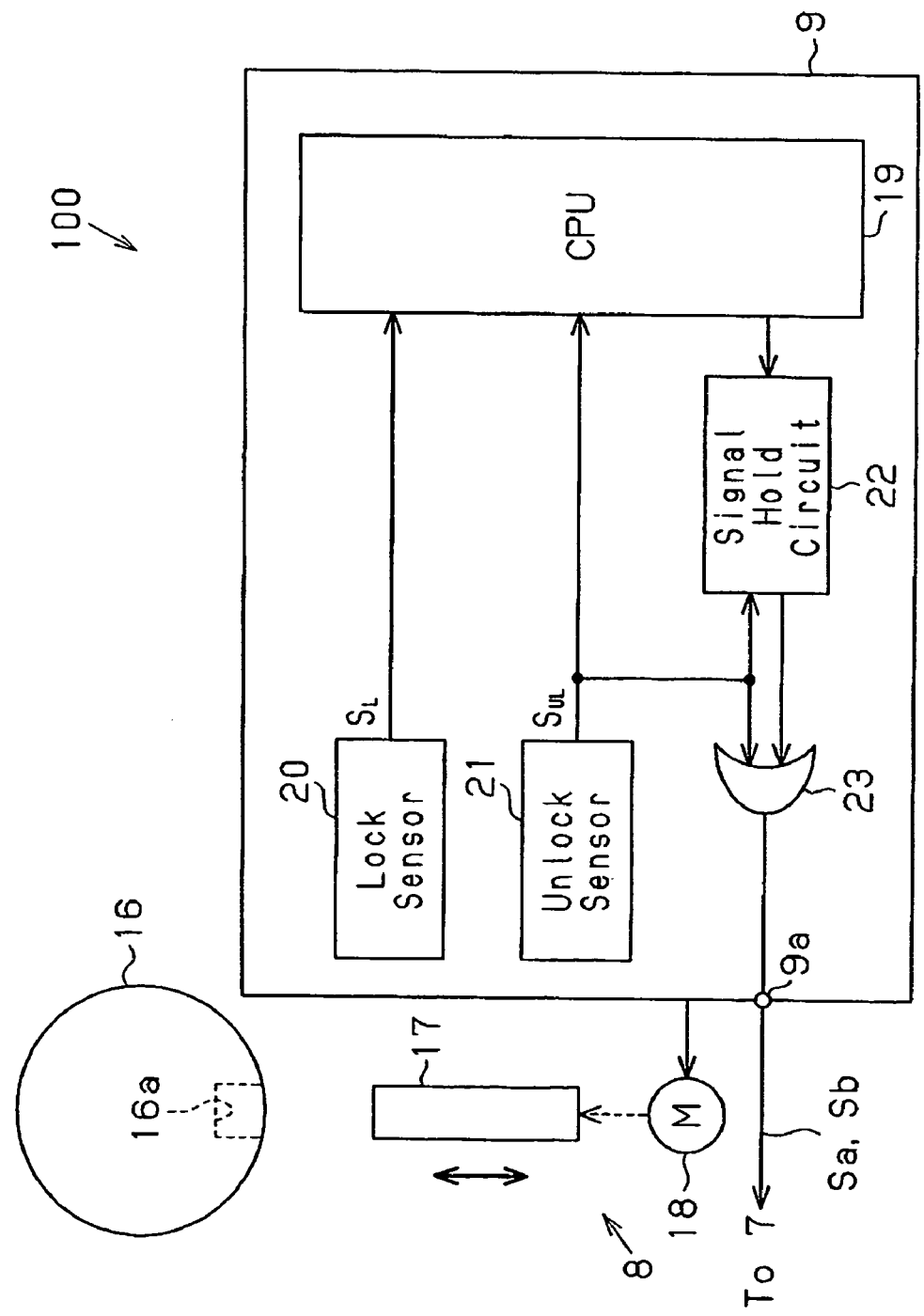
FIG. 2 is a block diagram of the electric steering lock.

FIG. 2 is a block diagram of the electric steering lock. The steering lock mechanism 8 includes a latch member such as a lock bar 17, which moves between a lock position and an unlock position, and a drive means such as a steering lock motor 18, which moves the lock bar 17 back and forth. When located at the lock position, the lock bar 17 is engaged with a socket (recess) 1βa formed in the steering shaft 16. In this situation, the steering lock mechanism 8 is in a lock state. When located at the unlock position, the lock bar 17 is disengaged from the socket 1βa. In this situation, the steering lock mechanism 8 is in an unlock state.

The steering lock ECU 9 includes a CPU 19, a lock sensor 20 for detecting whether or not the lock bar 17 is engaged within the socket 1βa, and an unlock sensor 21 for detecting whether or not the lock bar 17 is disengaged from the socket 1βa. The lock and unlock sensors 20 and 21 are each formed by a non-contact switch such as a Hall IC. The lock sensor 20 goes ON when the steering lock mechanism 8 shifts to the lock state to output an H level detection signal (ON signal or lock detection signal $S_L$O. The lock sensor 20 goes OFF when the steering lock mechanism 8 shifts to the unlock state to output an L level detection signal (OFF signal). The unlock sensor 21 goes ON when the steering lock mechanism 8 shifts to the unlock state to output an H level detection signal (ON signal or unlock detection signal $S_{\bar{U}_L}$). The unlock sensor 21 goes OFF when the steering lock mechanism 8 shifts to the lock state to output an L level detection signal (OFF signal). The CPU 19 is an example of a control means. The sensors 20 and 21 function as a detection means.

The CPU 19 is connected to the lock sensor 20 and the unlock sensor 21. The CPU 19 determines the operation state of the steering lock mechanism 8 from the detection signals from the sensors 20 and 21. For example, when receiving the ON signal (lock detection signal $S_L$) from the lock sensor 20 and the OFF signal from the unlock sensor 21, the CPU 19 determines that the steering lock mechanism 8 is in the lock state. The CPU 19 may also determine that the steering lock mechanism 8 is in the lock state when receiving the ON signal (lock detection signal $S_L$) from the lock sensor 20. When receiving the OFF signal from the lock sensor 20 and the ON signal (unlock detection signal $S_OL$) from the unlock sensor 21, the CPU 19 determines that the steering lock mechanism 8 is in the unlock state. The CPU 19 may also determine that the steering lock mechanism 8 is in the unlock state when receiving the ON signal (unlock detection signal $S_{DL}$) from the unlock sensor 21.

The steering lock ECU 9 includes a signal hold circuit 22, which is connected to the CPU 19 and unlock sensor 21, and an OR circuit 23, which is connected to the unlock sensor 21 and the signal hold circuit 22. The signal hold circuit 22 receives an output signal from the CPU 19 and a detection signal from the unlock sensor 21. In response to a command from the CPU 19, the signal hold circuit 22 outputs a hold signal held at the voltage of the detection signal from the unlock sensor 21. The OR circuit 23 outputs an output signal (Sa or Sb) based on the two input signals (the hold signal and the detection signal from the unlock sensor 21) from an output terminal 9a of the steering lock ECU 9. For example, when at least either one of the detection signal from the unlock sensor 21 and the hold signal from the signal hold circuit 22 is at the H level, the OR circuit 23 outputs an H level unlock completion signal Sa. The signal hold circuit 22 is formed, for example, by a flip-flop IC. The signal hold circuit 22 and the OR circuit 23 form a state holding means or an erroneous signal output prevention circuit.

The signal hold circuit 22 is a low voltage applicable circuit, which is capable of operating even when the sensors 20 and 21 cannot generate output signals due to low battery voltage. The signal hold circuit 22 holds the detection signal of the unlock sensor 21 and outputs a hold signal in accordance with a command from the CPU 19.

When an ON signal is output from the lock sensor 20 or the unlock sensor 21, the CPU 19 sends a state hold command to the signal hold circuit 22. In response to the state hold command, the signal hold circuit 22 holds the current signal state (the voltage of the detection signal that is being provided from the unlock sensor 21) and outputs a signal corresponding to the signal state.

For example, when the steering lock mechanism 8 is in the unlock state, the signal hold circuit 22 is provided with an ON signal from the unlock sensor 21. In this case, the signal hold circuit 22 outputs a signal having the level of the ON signal (H level). When the steering lock mechanism 8 is in the lock state, the signal hold circuit 22 is provided with an OFF signal from the unlock sensor 21. In this case, the signal hold circuit 22 outputs a signal having the level of the OFF signal (L level).

The OR circuit 23 outputs an ON signal (unlock completion signal) Sa from the output terminal 9a when at least one of the two input signals (the hold signal from the signal hold circuit 22 and the detection signal from the unlock sensor 21) has an H level. Accordingly, the unlock completion signal Sa is output from the output terminal 9a when the unlock sensor 21 outputs an ON signal. The unlock completion signal Sa is also output from the output terminal 9a when the unlock sensor 21 does not output an ON signal but the signal hold circuit 22 outputs an H level hold signal.

The operation of the electric steering lock will now be described.

The driver enters the parked vehicle 1 and operates the engine switch 15 so that the steering lock mechanism 8 shifts to the unlock state. As a result, the lock sensor 20 goes OFF, and the unlock sensor 21 goes ON. The unlock sensor 21 provides an ON signal to the CPU 19, the signal hold circuit 22, and the OR circuit 23. In response to the ON signal from the unlock sensor 21, the CPU 19 issues a state hold command to the signal hold circuit 22. In response to the state hold command, the signal hold circuit 22 holds the ON signal from the unlock sensor 21 and provides an H level hold signal to the OR circuit 23.

Since the detection signal from the unlock sensor 21 and the hold signal from the signal hold circuit 22 both have an H level, the OR circuit 23 outputs an H level signal (unlock completion signal) Sa. Accordingly, the steering lock ECU 9 provides the unlock completion signal Sa to the immobilizer ECU 7. In response to the unlock completion signal Sa, the immobilizer ECU 7 issues an engine start enable command to the engine ECU 11. The engine ECU 11 starts the engine 10 when the engine ECU 11 receives the engine start enable command, the interior authentication is achieved, and the engine switch 15 is rotated to the start position.

If the unlock sensor 21 is not supplied with sufficient operation voltage from the battery, such as during cranking when much voltage is consumed by the engine system, the unlock sensor 21 shifts to a low voltage state. In this case, the unlock sensor 21 cannot generate an H level detection signal even though the steering lock mechanism 8 is in the unlock state. In the prior art, cranking would not be continued since the immobilizer ECU 7 is not provided with the unlock completion signal sa, which is necessary to start the engine.

In the preferred embodiment, the CPU 19 issues a state hold command to the signal hold circuit 22 when the unlock sensor 21 detects the unlock state. In response to the state hold command, the signal hold circuit 22 generates a hold signal held at a potential corresponding to the state (unlock state) of the steering lock mechanism 8. Accordingly, the signal hold circuit 22 continuously outputs an H level hold signal before cranking is started. Cranking is then started when the driver rotates the, engine switch 15 to the start position. The cranking may cause the unlock sensor 21 to shift to a low voltage state such that an H level detection signal cannot be generated. However, in the preferred embodiment, the signal hold circuit 22 continuously outputs an H level hold signal. Thus, the unlock completion signal Sa is continuously output from the output terminal 9a of the steering lock ECU 9.

The immobilizer ECU 7 thus receives an unlock completion signal Sa from the steering lock ECU 9 even if the cranking causes the unlock sensor 21 to shift to a low voltage state. The immobilizer ECU 7 then sends an engine start enable command to the engine ECU 11. Accordingly, in response to the engine start enable command, the engine ECU 11 continues cranking and starts the engine 10.

When the driver stops the vehicle 1, the driver rotates the engine switch 15 to the OFF position to stop the engine 10 and then exits the vehicle 1. This causes the door ECU 6 to provide an exit detection signal to the immobilizer ECU 7 based on the detection signal from the courtesy switch 13. In response to the exit detection signal, the immobilizer ECU 7 issues a lock command to the steering lock ECU 9. In response to the lock command, the steering lock ECU 9, which is in the lock standby state, drives the steering lock mechanism 8 to lock the steering shaft 16.

As a result, the lock sensor 20 goes ON, and the unlock sensor 21 goes OFF. The lock sensor 20 provides an ON signal to the CPU 19, and the unlock sensor 21 provides an OFF signal to the CPU 19, the OR circuit, and the signal hold circuit 22. In response to the ON signal from the lock sensor 20, the CPU 19 issues a state hold command to the signal hold circuit 22. In response to the state hold command, the signal hold circuit 22 holds the current signal state, that is, the OFF signal of the unlock sensor 21, and outputs an L level hold signal. The OR circuit 23 outputs an L level signal since the detection signal from the unlock sensor 21 and the hold signal from the signal hold circuit 22 are both L level signals. Accordingly, the steering lock ECU 9 outputs an L level OFF signal.

The preferred embodiment has the advantages described below.

(1) Even if a change in the operation voltage causes the unlock sensor 21 to output an erroneous detection signal that does not correspond to the actual state of the steering lock mechanism 8, the steering lock ECU 9 outputs the correct signal that corresponds to the actual state of the steering lock mechanism 8. This is because the signal hold circuit 22 generates the hold signal in correspondence with the state of the steering lock mechanism 8. This prevents the steering lock ECU 9 from outputting an erroneous signal. Additionally, even when the voltage of the detection signal from the unlock sensor 21 decreases, cranking is continued since the steering lock ECU 9 continues to output the unlock completion signal sa. This ensures engine starting.

(2) In response to the state hold command of the CPU 19, the signal hold circuit 22 holds a detection signal that corresponds to the operation state of the steering lock mechanism 8 and outputs a hold signal. Thus, the operation of the signal hold circuit 22 is controlled by the CPU 19. This simplifies the circuit configuration of the signal hold circuit 22. Thus, the signal hold circuit 22 is compact and inexpensive.

(3) The signal hold circuit 22 is formed by a flip-flop IC, which is easy to procure. Therefore, the erroneous signal output prevention circuit that includes the signal hold circuit 22 and the OR circuit 23 is manufactured at low cost.

(4) The flip-flop IC of the signal hold circuit 22 is a low voltage applicable circuit. Therefore, the signal hold circuit 22 remains operable even under low voltages during cranking. In particular, the use of a flip-flop IC that is operable at an extremely low voltage keeps the signal hold circuit 22 operating even when the cranking causes a voltage decrease.

It should be apparent to those skilled in the art that the present invention may be embodied in many other specific forms without departing from the spirit or scope of the invention. Particularly, it should be understood that the present invention may be embodied in the following forms.

The signal hold circuit 22 functioning as a state holding means is not limited to a flip-flop IC and may be, for example, a booster circuit (capacitor) for raising the voltage level of the detection signal from the unlock sensor 21 and outputting a signal with the raised voltage level. With the use of such a booster circuit, the configuration of the signal hold circuit 22 may be further simplified than when using a flip-flop IC.

The signal hold circuit 22 holds the detection signal from the unlock sensor 21 and outputs a hold signal in response to the state hold command from the CPU 19. Instead, the signal hold circuit 22 may autonomously hold the detection signal from the unlock sensor 21 and output a hold signal without receiving a state hold command from the CPU 19. For example, in response to an ON signal from the unlock sensor 21, the signal hold circuit 22 may hold the ON signal and output an H level hold signal. Then, the signal hold circuit 22 resets the hold signal in response to an ON signal from the lock sensor 20.

The unlock sensor 21 outputs an ON signal when the steering lock mechanism 8 is unlocked and outputs an OFF signal when the steering lock mechanism 8 is not unlocked. Instead, an OFF signal may be output when the steering lock mechanism 8 is unlocked, and an ON signal may be output when the steering lock mechanism 8 is not unlocked.

The erroneous signal output prevention circuit, which includes the hold circuit 22 and the OR circuit 23, may be connected to the lock sensor 20 instead of the unlock sensor 21. In this case, the steering lock ECU 9 provides a correct lock completion signal Sb to the immobilizer ECU 7 even when the operation voltage of the lock sensor 20 temporarily decreases. The lock sensor 20 and the unlock sensor 21 may each be connected to a different erroneous signal output prevention circuit. In this case, the steering lock ECU 9 provides the immobilizer ECU 7 with the correct lock completion signal Sb and the correct unlock completion signal 2b even when the operation voltage of the lock sensor 20 and the unlock sensor 21 temporarily decreases.

The wireless communication between the vehicle 1 and the electronic key 3 is not limited to smart communication in which the electronic key 3 responds to a request signal Sre from the vehicle 1 to output an ID code signal Sid unique to the key so as to perform an operation of the vehicle 1 when ID authentication is achieved. The wireless communication performed between the vehicle 1 and the electronic key 3 may be, for example, transponder communication using a transponder of the electronic key 3, or radio wave communication in which an ID code unique to the key is transmitted by pressing a button of the electronic key 3.

The lock sensor and unlock sensors 20 and 21 are not limited to a Hall IC and may be other electric non-contact switches such as an optical sensor.

In the preferred embodiment, the erroneous signal output prevention circuit is employed in the vehicle 1. In addition to automobiles, the erroneous signal output prevention circuit may be used in any type of vehicle. Further, the application of the erroneous signal output prevention structure is not limited to the vehicle 1. The erroneous signal output prevention structure is also applicable to any structure having a steering lock mechanism 8.

The present examples and embodiments are to be considered as illustrative and not restrictive, and the invention is not to be limited to the details given herein, but may be modified within the scope and equivalence of the appended claims.

The invention claimed is:

1. An electric steering lock for locking and unlocking a steering shaft having a socket, the electric steering lock comprising:
   a steering lock mechanism including:
      a latch member movable to be engaged with and disengaged from the socket in the steering shaft; and
      a drive means for driving the latch member, the steering lock mechanism being shiftable between a plurality of operation states including a lock state in which the latch member is engaged with the socket and an unlock state in which the latch member is disengaged from the socket;
   a detection means for detecting at least one of the operation states, including the lock state and the unlock state, of the steering lock mechanism and for outputting a detection signal when shifting to the at least one of the operation states is completed;
   a state holding means, connected to the detection means, for generating a hold signal held at a voltage that is the same as that of the detection signal and for outputting a completion signal indicating that shifting to the at least one of the operation states has been completed in accordance with at least one of the detection signal, provided from the detection means, and the hold signal; and
   a control means, connected to the detection means and the state holding means, for determining whether or not shifting to the at least one of the operation states has been completed based on the detection signal, the control means providing a state hold command to the state holding means in response to the detection signal, wherein the state holding means holds the detection signal in response to the state hold command to output a hold signal corresponding to the voltage of the held detection signal.

2. The electric steering lock according to claim 1, wherein: the detection means outputs an unlock detection signal when the steering lock mechanism detects the unlock state; and the state holding means holds the hold signal at a voltage corresponding to the unlock signal and outputs an unlock completion signal when at least one of the hold signal and the unlock detection signal has the voltage indicating the unlock state.

3. The electric steering lock according to any claim 1, wherein the state holding means includes: a hold circuit for holding the detection signal provided from the detection means and outputting a hold signal having a voltage that is the same as that of the held detection signal; and an OR circuit, connected to the detection means and the hold circuit, for outputting an H level signal when at least one of the hold signal and the detection signal has an H level.

4. The electric steering lock according to claim 1, wherein the hold circuit is a flip-flop.

5. The electric steering lock according to claim 1, wherein the hold circuit is a booster circuit.

6. An electric steering lock for connection to a battery for power supply for locking and unlocking a steering shaft, the electric steering lock comprising:
   a latch member movable between a lock position at which the latch member is engaged with the steering shaft and an unlock position at which the latch member is disengaged from the steering shaft;
   a drive means for driving the latch member;
   a non-contact unlock sensor powered by the battery, the non-contact unlock sensor being activated to output an unlock detection signal when the latch member is in the unlock position;
   a hold circuit, connected to the unlock sensor, for outputting a hold signal held at a voltage that is the same as that of the unlock detection signal; and
   an OR circuit, connected to the unlock sensor and the hold circuit, for outputting an unlock completion signal when at least one of the unlock signal and the hold signal has a predetermined level; and
   a control circuit, connected to the unlock sensor and the hold circuit, for controlling the hold circuit, the control circuit providing a state hold command to the hold circuit in response to the unlock detection signal, wherein the hold circuit holds the unlock detection signal in response to the state hold command and continuously outputs a hold signal corresponding to the held unlock detection signal.

7. The electric steering lock according to claim 6, wherein the OR circuit continuously outputs the unlock completion signal when at least one of the unlock signal and the hold signal has a predetermined level.

* * * * *

UNITED STATES PATENT AND TRADEMARK OFFICE
CERTIFICATE OF CORRECTION

PATENT NO. : 7,589,433 B2
APPLICATION NO. : 10/576237
DATED : September 15, 2009
INVENTOR(S) : Otani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 571 days.

Signed and Sealed this

Twenty-first Day of September, 2010

David J. Kappos
*Director of the United States Patent and Trademark Office*